March 3, 1970   N. C. SCHULTZ ET AL   3,497,989
SHELLFISH TRAP

Filed June 14, 1968   2 Sheets-Sheet 1

*INVENTORS*
NILS C. SCHULTZ
JOSEPH J. MANNO

*Knox & Knox*

March 3, 1970  N. C. SCHULTZ ET AL  3,497,989
SHELLFISH TRAP
Filed June 14, 1968  2 Sheets-Sheet 2
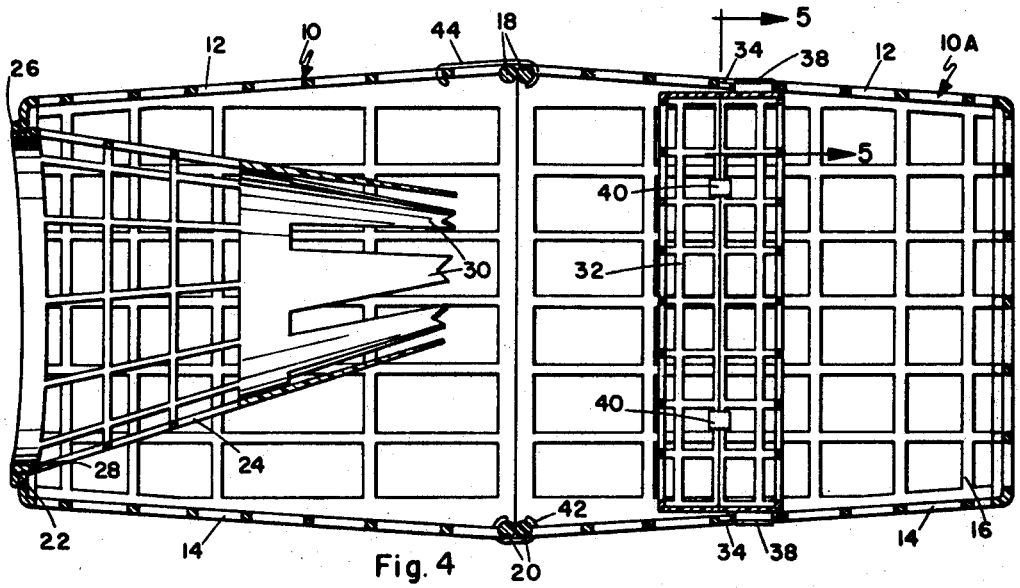
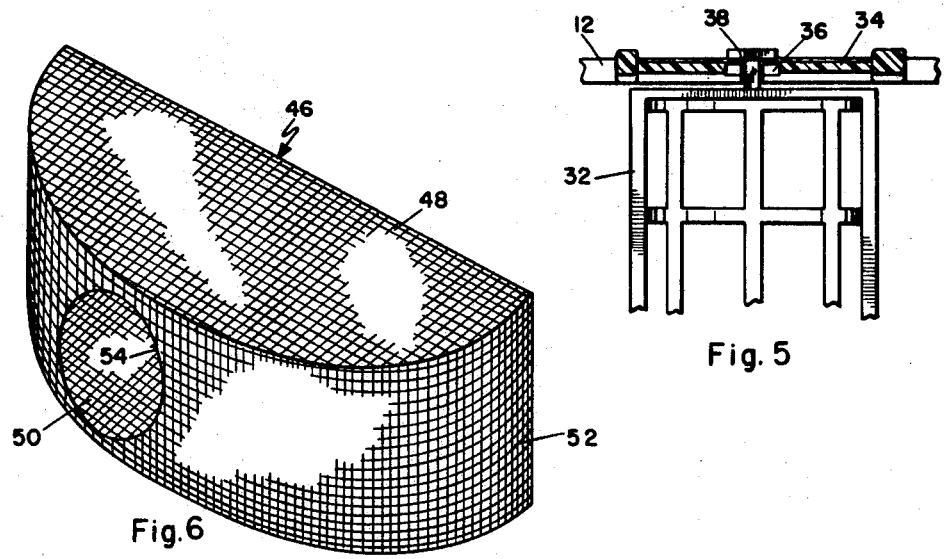
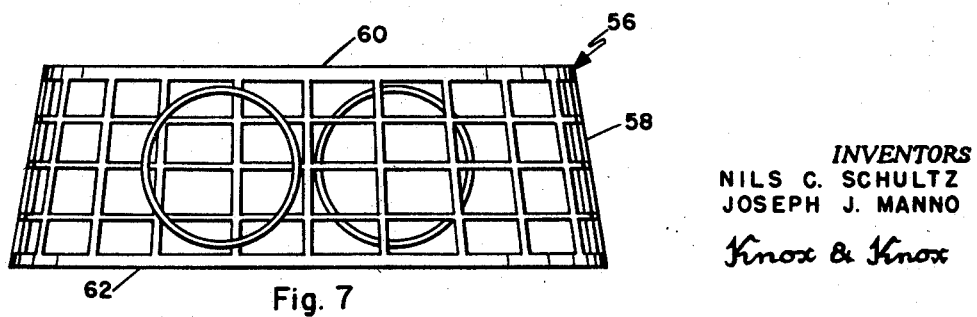
INVENTORS
NILS C. SCHULTZ
JOSEPH J. MANNO
Knox & Knox United States Patent Office 3,497,989
Patented Mar. 3, 1970

3,497,989
SHELLFISH TRAP
Nils C. Schultz, La Jolla, and Joseph J. Manno, San Diego, Calif., assignors to Fathoms Plus, Inc., a corporation of California
Filed June 14, 1968, Ser. No. 737,023
Int. Cl. A01k 69/08
U.S. Cl. 43—100                                    4 Claims

ABSTRACT OF THE DISCLOSURE

The trap is basically elliptical in plan form, with inlets and bait holders positioned so that shellfish moving around the trap come gradually closer to the bait and are more likely to enter the trap quickly. Plastic construction is used for resistance to wear and to prolonged immersion in water, the inlets and bait holders being separable for ease of maintenance, and the trap being easily opened for full access and to facilitate stacking.

BACKGROUND OF THE INVENTION

The present invention relates to fishing apparatus and specifically to a shellfish trap.

A large number of the shellfish traps in present use are handmade by fisherman and each requires several hours of work. Basic construction is either wood or metal, in the form of woven baskets or wire mesh containers. Wooden traps are subject to rotting and to attack by marine borers, it being common practice to dry the traps periodically to kill the worms. This may require two or three weeks each time, during which the traps are not in use. Metal traps corrode rapidly from exposure to salt water and do not last very long. It is therefore necessary for fishermen to make a number of reserve traps for replacement purposes.

While trap design varies somewhat, the usual type has a single entrance in the side or on top and shellfish spend much time searching for the entrance to reach the bait.

SUMMARY OF THE INVENTION

The trap described herein is molded from plastic material which is not affected by water or marine life and which will withstand rough handling and continuous use with a minimum of maintenance. In plan form the trap is basically elliptical and has opposed inlets in the sides, positioned so that shellfish moving around the outside of the trap come gradually closer to the bait and are led to the inlets. The inlets are also of molded plastic and have internal fingers which prevent the shellfish from escaping once in the trap. Adjacent each inlet is a plastic bait container which is removable for easy loading. To simplify handling and reduce the cost of manufacture, the trap is made from two identical cage-like halves hinged together and is readily opened to remove the catch. With the inlets and bait holders removed, the traps are stackable. While primarily for lobster and crab fashing, the trap is easily adapted for smaller crustaceans such as shrimp or prawns.

BRIEF DESCRIPTION OF THE DRAWINGS

FIGURE 4 is an enlarged sectional view taken on line 4—4 of FIGURE 1;
FIGURE 5 is an enlarged sectional view taken on line 5—5 of FIGURE 4;
FIGURE 6 is a perspective view of an adapter for use in catching small crustaceans in the basic trap;
and
FIGURE 7 is a side elevation view of an alternative trap configuration.

Similar characters of reference indicate similar elements and portions throughout the specification and throughout the views of the drawings.

DESCRIPTION OF THE PREFERRED EMBODIMENTS

Figure 2:
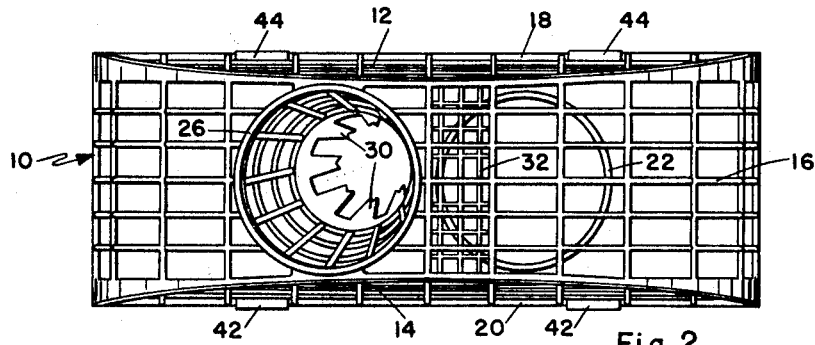
FIGURE 2 is a side elevation view thereof.

The trap is composed of two identical frame units 10 and 10A, joined along the major axis of the elliptical plan form of the trap, the following description of frame unit 10 thus applying equally to frame unit 10A. The basic frame unit is a cage-like structure of molded plastic, such as polyvinyl or similar material having suitable resiliency and abrasion resistance, and has a semi-elliptical top panel 12, a similar bottom panel 14 and a side wall 16 joining the curved edges of the two panels. At the straight or major axis edge the frame unit is open and is reinforced by a thickened edge member 18 in the top panel 12 and a similar thickened edge member 20 in the bottom panel 14. The frame unit is tapered in height in the direction of the minor axis of the ellipse, the side wall 16 being deeper at the ends than at the minor axis, as will be apparent in FIGURE 2. This increases the rigidity of the structure in addition to making the frame easier to separate from the mold. In the side wall 16, immediately to one side of the minor axis, is a circular opening bounded by a ring member 22 incorporated into the cage structure.

Mounted in the ring member 22 is an inlet 24, comprising a frusto-conical plastic cage-like structure, the large end of which has a flange 26 with a peripheral channel 28 to fit over the ring member, as in FIGURE 4. With the plastic construction the inlet and ring member can be deformed sufficiently to snap the inlet into place, yet the connection will be tight enough to hold securely in use. The axis of the inlet 24 is offset slightly from perpendicular to the plane of flange 26, so that the inlet is inclined upwardly into the trap to space the inner end well above the bottom panel 14. To further prevent escape of the catch, the inner end of the inlet 24 is divided longitudinally into a plurality of resilient fingers 30, which will not support a shellfish attempting to climb out. The general structure of the inlet is similar to that shown and described in our U.S. Patent No. 3,271,894, entitled Head for Shellfish Trap. Inlet structure is partially omitted from FIGURES 2 and 3 for clarity.

Adjacent the inner end and to one side of inlet 24 is a bait holder 32, comprising a cage-like cylindrical structure of plastic material which is mounted vertically in the frame unit. Corresponding portions of the top panel 12 and bottom panel 14 have web plates 34 between the cage frame members, the web plates having keyhole slots 36. On each end of bait holders 32 is a T-flange lug 38 which will fit into a keyhole slot 36 and secure the bait holder. To facilitate loading, the bait holder is divided longitudinally, the parts being held together by retainers 40 pressed into place, or by a hinge and catch arrangement of conventional type.

The two frame units 10 and 10A are secured together to form a complete trap by means of hinges 42 and catches 44. Hinges 42 may be simple clip-like elements coupling the thickened edge member 20 of the frame units, as in FIGURE 4 or may be actual hinges secured to the structure in any suitable manner. Catches 44 are also shown as being clip-like and snap over the upper edge members 18 and any convenient portion of the frame structure. Other catches may be equally suitable, it being a simple matter to include webs or stiffening in the frame structure to suit particular fittings.

Figure 1:
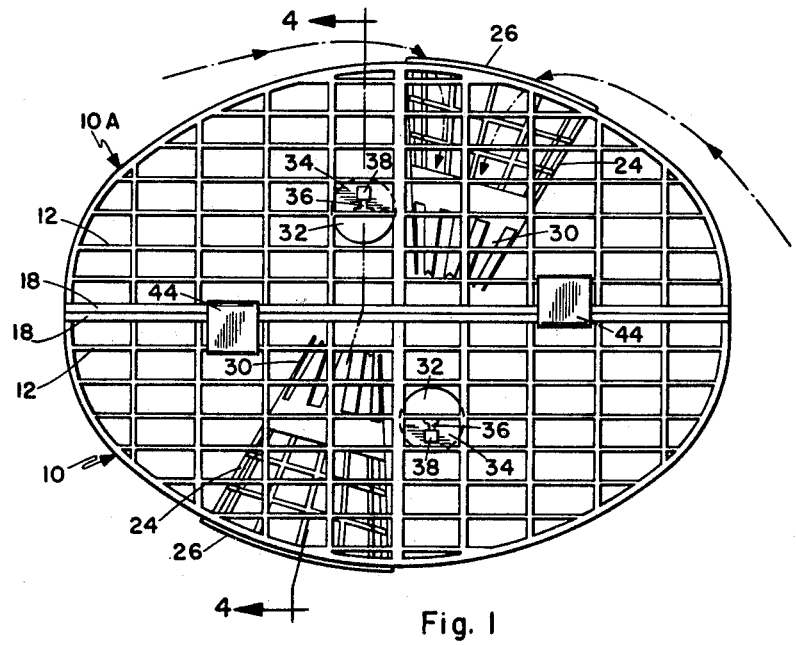
FIGURE 1 is a top plan view of the trap.

The assembled trap has the elliptical plan form shown in FIGURE 1, with two substantially opposed inlets, each with an adjacent bait holder, on opposite sides of the minor axis of the ellipse. Shellfish approaching from either side of the trap will generally find the large inlets with little trouble. When approaching from an end of the trap the shellfish will tend to follow the side wall and, due to the elliptical shape, will come progressively closer to the bait, as indicated by broken line arrows in FIGURE 1. Since shellfish detect bait primarily by sense of smell, this approach will entice the creatures to continue in one direction to reach an inlet and enter the trap. Shellfish have been observed attempting to reach through the inlet mesh to the bait holder but, by having the bait holder at the side of the inner end of the inlet, the creatures must move completely into the trap to gain access to the bait. Once inside the trap the shellfish may be attracted by the opposite bait holder across from the entry, but this adds to the enticement and still requires total entry of the creature into the trap to reach the bait. With some types of conventional traps it may be necessary for the shellfish to move away from the bait to reach an entrance, which is not a natural action. In such a case shellfish may spend considerable time trying to force entry in proximity to the bait, rather than seeking a proper entrance. In actual tests of the illustrated elliptical traps spaced in a string of conventional traps, it was found that the elliptical type consistently caught more acceptable shellfish than the conventional type.

In this type of trap it is usual to use an open mesh or cage structure with the openings sufficiently large to permit the escape of small unwanted creatures, or shellfish which are clearly under the legal size which may be taken. To catch shrimp or similar small shellfish, it is common to use special traps of fine mesh. However, since the natural food seeking actions of shellfish are the same, regardless of size, it is desirable to ue the elliptical form of trap for all sizes. Rather than make special traps, it is a simple matter to use an insert 46 of fine mesh as in FIGURE 6, which may be of wire or plastic material. The insert 46 is shaped to fit closely into frame unit 10 and has a top panel 48, a bottom panel 50 and a side wall 52, with an opening 54 to clear the inlet 24. It is not essential to use fine mesh material over the inlet, since once the creatures fall into the trap they are unable to climb back through the framework of the inlet.

Figure 3:
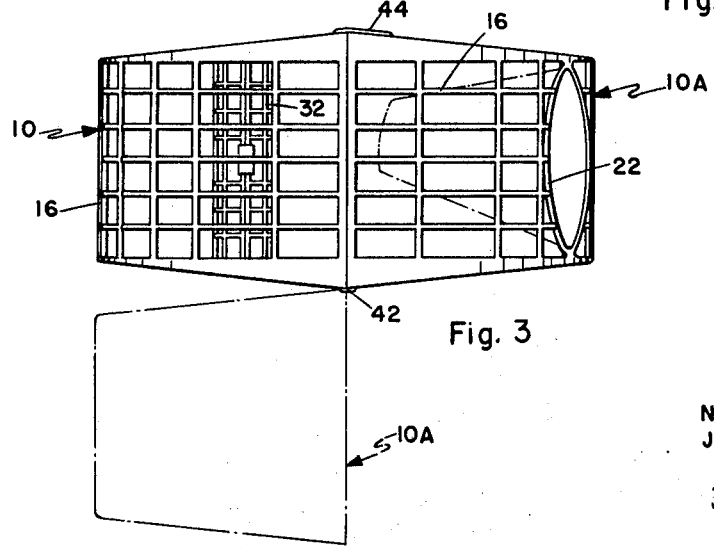
FIGURE 3 is an end elevation view thereof.

With the inlets and bait containers removed and catches 44 released, the frame units can be hinged apart in side by side relation, as in the broken line position in FIGURE 3, in which configuration a number of traps can be nested in a stack for ease of handling and storage. The inlets can also be nested due to their conical shape and the bait holders are quite small, so a large number of traps can be stored in considerably less space than an equal number of conventional traps.

For some purposes it may be desirable to use the modified form of trap shown in FIGURE 7. The elliptical plan form and inlet arrangement are retained but the modified frame unit 56 has an inclined side wall 58, so that the flat top panel 60 is smaller than the flat bottom panel 62. This form would be very stable on a flat surface and could be used in shallow water where bed conditions are known. However, the basic form described in detail will adapt to a variety of smooth, undulating, or rocky bed conditions.

It is understood that minor variation from the form of the invention disclosed herein may be made without departure from the spirit and scope of the invention, and that the specification and drawings are to be considered as merely illustrative rather than limiting.

We claim:
1. A shellfish trap, comprising:
   a cage-like frame of substantially elliptical plan form, having a top panel, a bottom panel and a continuous peripheral side wall;
   said side wall having a pair of substantially opposed openings therein adjacent to and on opposite sides of the minor axis of the elliptical plan form;
   an inwardly converging inlet mounted in each of said openings;
   and a bait holder secured to at least one of said panels immediately adjacent the inner end of at least one of said inlets but offset to one side thereof.
2. The structure of claim 1, wherein said frame comprises a pair of similar semi-elliptical frame units joined along the major axis of the ellipse, the confronting edges of said frame units having integral reinforced members;
   retaining means including hinges attached to said reinforced members and pivotally interconnecting the frame units at one edge portion, and catches coupling the reinforced members at another edge portion.
3. The structure of claim 1, wherein said bait holder has flanged lugs at opposite ends, said top and bottom panels having correspondingly slotted web portions in which said lugs are engaged in keyed relation.
4. The structure of claim 1, wherein each of said inlets has a bait holder offset to the side of the inner end thereof, adjacent to the opposed inlet, and each bait holder being substantially opposed to the inner end of the opposite inlet.

References Cited

UNITED STATES PATENTS

| | | | |
|---|---|---|---|
| 411,746 | 9/1889 | Hurst | 43—65 |
| 1,305,333 | 6/1919 | Anderson | 43—65 |
| 2,533,617 | 12/1950 | Palmer | 43—100 |
| 3,099,890 | 8/1963 | Madere | 43—100 |
| 3,271,894 | 9/1966 | Manno et al. | 43—100 X |

WARNER H. CAMP, Primary Examiner